June 26, 1934.  H. KREIDEL  1,964,638
THERMOSTATIC LUBRICANT FLOW REGULATOR
Filed Dec. 19, 1931
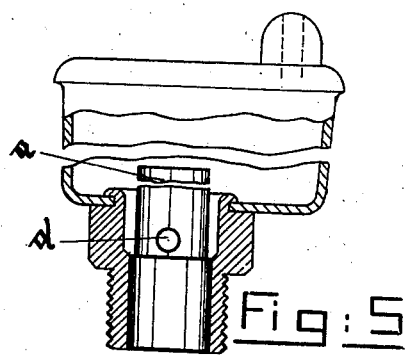
Fig: 5
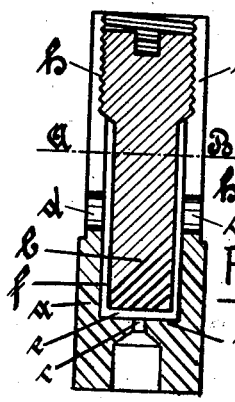
Fig: 2
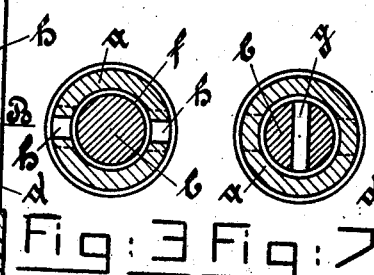
Fig: 3   Fig: 7
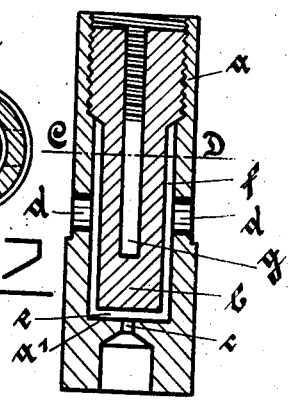
Fig: 6
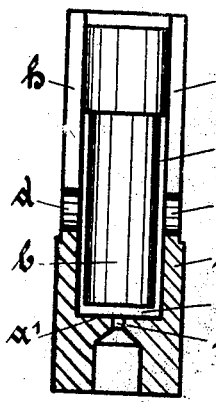
Fig: 4
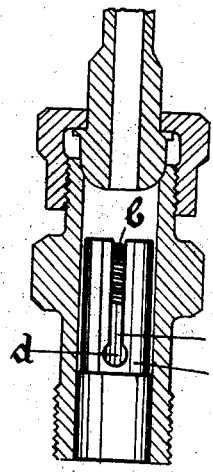
Fig: 1
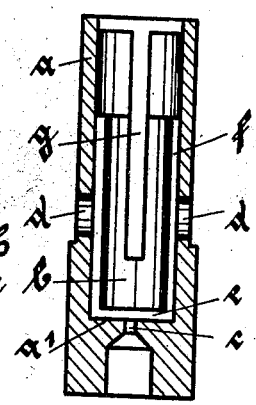
Fig: 8
Inventor
Hans Kreidel Patented June 26, 1934

1,964,638

UNITED STATES PATENT OFFICE 1,964,638

THERMOSTATIC LUBRICANT FLOW REGULATOR

Hans Kreidel, Wiesbaden, Germany

Application December 19, 1931, Serial No. 582,167
In Germany January 26, 1931

2 Claims. (Cl. 184—1)

Thermostatical devices for regulating the flow of a lubricant through an oiler or an oil tubing are known. They serve to decrease the passage for the lubricant with increase of temperature so as to prevent too rapid a flow of the lubricant whose viscosity decreases with increase of temperature, and an excess of oil at the point to be lubricated. Devices of the kind as they have been known hitherto are unsuitable for general use inasmuch as they are of a complicated construction, high in price and lack reliability. They are, moreover, unable to answer special requirements such as they may arise, for example in connection with the lubrication of small railroad signals which frequently need one drop of oil only per day but which, on the other hand, are subjected to temperature differences of more than 70° C.

It is, moreover, well nigh impossible to use devices of the known kind in connection with automotive or other vehicles, with machines and the like where vibrations are unavoidable, as these devices all show too high a sensitiveness to influences of these vibrations and shocks. A fitting into tubings of the known devices, such as is required in connection with central lubricating devices is quite out of question.

The object of the present invention is to provide a thermostatically controlled oil flow regulating device that solely consists of two small and simple parts and allows of quick and easy assembling whilst it simultaneously provides high sensitiveness in operation but no sensitiveness to outside influences such as vibrations and shocks.

With the object to provide universal utility, the device is built up as an integral unit and is given such outlines as will allow its being fitted into every oil tubing or oil outflow channel. The form of a small tubular casing has, for these reasons, been deemed most suitable as it allows of readily inserting or screwing in of the device into oil tubings and oil outflow channels.

Thermostatical devices of this kind must, as has already been indicated, answer highest requirements as far as simplicity of construction and especially reliability of working is concerned and they must at the same time not be oversensitive to mechanical influences.

It must moreover be borne in mind that devices of this kind to be installed into oil tubings and oil outflow channels must be of extremely limited size whilst they must absolutely ensure highest sensitiveness to temperature differences, considering that they are frequently called upon to deliver minute quantities, perhaps often one single drop of oil only per day. Absolute uniformity in the supply of the lubricant is imperative and a difference in viscosity of the lubricant such as it is caused by variations in temperature must in no way be allowed to unfavorably influence the uniformity in the lubricant supply. The passage for the lubricant must often be reduced to 1/100 of a millimeter and even less. It is moreover absolutely necessary to ensure an easy and reliable adjustment of the device especially on the first occasion and no alteration through vibrations and the like liable to prejudice or stop an efficient operation must occur once the device has been properly adjusted.

The parts constituting the device must have a fit that cannot be unfavorably altered once proper adjustment has been effected. This is obtained by providing either an expanding member that fits into a casing with spring action, or by providing an expanding member with spring action and inserting it into a rigid casing. The spring action of these parts is obtained by splitting them appropriately or by the provision of slots and both parts may be united to one another either by screwing or by pressing the one into the other.

The expanding member is generally made of a material that contains rubber, as for example ebonite or the like, which material has proved more suitable in practice than materials of another kind used hitherto for this purpose in consequence of its high coefficient of expansion and of its immunity against oil influences. In this way the device can be kept very small in size and guarantees a uniform and highly reliable operation.

The accompanying drawing shows some examples of how the invention may be carried out and how the device may be employed.

Fig. 1 is a longitudinal section through a tubing with the thermostatically controlled oil flowing device inserted. The device is shown in front view, casing and expanding member screwed together, the former being split to provide a spring action.

Fig. 2 shows the use of the thermostatically controlled oil flow device in a longitudinal section to a somewhat increased scale.

Fig. 3 is a section on the line A—B of Fig. 2.

Fig. 4 shows a longitudinal section of a thermostatically controlled oil flow device, the same as in Fig. 2, but with the casing and expanding member not screwed together but pressed into one another.

Fig. 5 is a longitudinal section through an oiler with a thermostatically controlled oil flow device inserted into the outflow passage. The device is shown in front view, casing and expanding member are screwed together, and spring action is provided by partially splitting the expanding member.

Fig. 6 shows the thermostatically controlled oil flow device in a longitudinal section to a somewhat increased scale.

Fig. 7 is a section on the line C—D of Fig. 6.

Fig. 8 shows a longitudinal section of the thermostatically controlled oil flow device similar to that shown in Fig. 6 but with the casing and expanding member not screwed together but simply pressed into one another.

The thermostatically controlled oil flow device consists of a casing $a$ of a material having as low an expansion coefficient as possible and the expanding member proper $b$ which is made of a rubber containing material having a high coefficient of expansion such as, for example ebonite or the like and which is inserted into the casing from the open side of the latter (screwed in as shown in Figs. 2 and 6 or pressed in as shown in Figs. 4 and 8.) The tubular casing has an oil outflow opening $c$ in its bottom part $a^1$ and special borings $d$ on the sides serving as oil passages. The expanding member $b$ is in the form of a rod of suitable size and conformation so that its inner end surface will lie in close proximity to the surface of the bottom part $a^1$ of the casing $a$. Thus a free space $e$ will be formed between said bottom and the end of the expansible member $b$, which space $e$, with a change in temperature and consequent alteration in the length of the expansible member, will decrease or increase the cross-sectional area of the passageway to the oil outlet $c$.

The outer wall of the thinner part of the expanding member $b$ of rod form forms together with the inner wall of the casing $a$ an annular space $f$ through which the oil that enters through the holes $d$ of the wall is led to the bottom space $e$ and thence to the outflow opening $c$.

With a view to provide an appropriate fit of the expanding member $b$ in the casing $a$ and to render it secure against vibrations, either the former is provided with a longitudinal slot $g$ (as shown in Figs. 6, 7 and 8) extending from the bigger dimensioned end, or the wall of the casing is provided with longitudinal slots $h$ (as shown in Figs. 1 to 4) which extend from the bores $d$ upwards. These slots provide a sprinklike action and tend to improve the fit. The fit must naturally be appropriate from the beginning but small irregularities will be amply compensated by the springlike action of the two parts. Alteration in size of the bottom space $e$ must correspond as far as possible to the differences in viscosity of the oil brought about by temperature influences, and for this reason, the first adjustment of the oil flow controlling device becomes of the utmost importance. In order to obtain and to maintain the necessary fine adjustment which those parts as the device is made of and which need not be overmuch accurate in finish, the form, assembly and fit of these parts requires special attention.

Once the device has been adjusted and the expanding member has been brought into its proper place in relation to the casing bottom, the parts are maintained in their adjusted position owing to the clamping action caused by the slots which action prevents all displacement through vibrations and shocks.

The first fine adjustment of the device or of its expanding member respectively in relation to the outflow opening in the bottom can be effected in various ways.

The complete device, i. e. the casing and the expanding member are assembled and subjected to a temperature that is somewhat in excess of the highest temperature under which it is liable to work. The expanding member $b$ is thereupon slightly pressed against the bottom of the casing $a$ (screwed or pushed) so as to close the outflow opening. With reduction of temperature, this expanding member will then shorten and the width of the space that forms as a consequence of this shortening of the expanding member between its front end and the bottom of the casing is that width which will answer the temperature limits in practical service, and which increases from this point corresponding with highest temperature to a point that answers lowest temperature that may occur in service.

In case that it is wanted to increase the oil supply, it is only necessary to effect the first adjustment at a still higher temperature.

The adjustment temperature must always be in excess of the highest temperature that is liable to occur in service, as otherwise the bottom outflow opening might be closed and the oil supply interrupted.

The first adjustment of the device may also be effected by subjecting it to the action of a gas or fluid stream directed towards the outflow opening $c$ and by adjusting the expanding member $b$ in relation to the casing bottom $a^1$. The position of the expanding member in relation to the casing bottom is then dependent upon the pressure and quantity of the fluid or gas stream and once adjusted, the expanding member maintains its position through the spring action of the parts that constitute the device. Once the device has been adjusted, it can either be screwed or pressed into the oil tubing or in the outflow channel of an oiler substantially as shown in Figs. 1 and 5.

Having thus described my invention what I claim as new and desire to secure by Letters Patent is:

1. In a heat responsive flow regulating device adapted to be inserted in an oil line, an outer case having an outflow port at one end and inflow ports in the walls thereof, said case having its diameter at the end containing the outflow port of such size to provide a leakproof fit within the oil line, the remaining portion having its diameter smaller than that of the oil line, said case having longitudinal slots extending the length of the portion of reduced diameter, a heat responsive plug adapted to be fitted into said case and held in adjusted position by the spring-like action of the slotted portion of said case, said plug being of smaller diameter at that portion which extends toward the inflow and outflow ports of the case and of a diameter substantially equal to the inner diameter of the casing in the remaining portion.

2. In a device of the class described, means for regulating the flow through an oil line according to the change in the viscosity of the oil due to temperature changes, comprising a case member, one portion of which is constructed to provide a secure leakproof fit with the wall of the oil line and the remaining portion of reduced diameter to provide a free passage between the outer wall of said case member and the wall of the oil line, inflow ports in said reduced portion, longitudinal slots in said reduced portion to provide resilient clamping means for a heat responsive device, one portion of which has its diameter less than that of the bore of said case member to provide free passage between said heat responsive device and the inner wall of said case member, said heat responsive device being positioned to regulate the flow of oil through the outflow port provided in one end of said case member.

HANS KREIDEL.